United States Patent [19]

Hobbs

[11] 4,257,486
[45] Mar. 24, 1981

[54] MULTIPLE ROW HARVESTER FOR PEANUT CROPS

[76] Inventor: Oliver K. Hobbs, P.O. Box 1306, Suffolk, Va. 23434

[21] Appl. No.: 3,862

[22] Filed: Jan. 16, 1979

[51] Int. Cl.³ .......................................... A01D 29/00
[52] U.S. Cl. .................................... 171/101; 171/102
[58] Field of Search .............. 171/101, 102, 103, 104, 171/45; 172/686, 159, 192, 33

[56] References Cited

U.S. PATENT DOCUMENTS

| | | | |
|---|---|---|---|
| 566,417 | 8/1896 | Sears | 172/686 |
| 2,669,820 | 2/1954 | Falkner | 171/101 |
| 3,319,720 | 3/1967 | Hobbs | 171/101 |
| 3,565,178 | 2/1971 | Whitfield | 171/101 |
| 3,625,291 | 12/1971 | Paulk et al. | 171/101 |
| 3,726,345 | 4/1973 | Harrell et al. | 171/101 |
| 3,847,225 | 11/1974 | Whitfield et al. | 171/101 |
| 3,976,143 | 8/1976 | Rodger | 171/101 |
| 3,989,111 | 11/1976 | Hobbs | 171/101 |

*Primary Examiner*—Paul J. Hirsch
*Attorney, Agent, or Firm*—Stevens, Davis, Miller & Mosher

[57] ABSTRACT

An apparatus adapted to dig four rows of growing peanut-laden plants and dispose them in turned position as two windrows, the apparatus having two sets of plows with the forward push of the leading end of the plows being away from the center of the front of the apparatus, and two elevating conveyors, one behind each set of plows, for removing as ribbons of peanut plants the four rows of plants, two ribbons of plants being elevated by each conveyor and dropped from the height of the conveyor to an inverting means to place the rows of plants from each conveyor in a windrow on the ground in a turned position.

15 Claims, 7 Drawing Figures

MULTIPLE ROW HARVESTER FOR PEANUT CROPS

This invention relates to root crop harvesting and more particularly to an improved apparatus for simultaneously digging multiple rows of peanut-laden plants, shaking loose the soil from the plants, and inverting and depositing them in windrows on the soil in which they grew, with the peanuts spaced above the ground.

In the mechanical harvesting of a peanut crop, rows of peanut-laden plants are first progressively dug from the ground to remove the buried peanuts which are attached to the plants, and then the plants are immediately passed in the form of two ribbons of moving plants onto an elevating bar conveyor. During their travel up the conveyor, soil is shaken from the plants by the rough action of the conveyor, with the soil falling through the spaces between the bars. At the end of their travel on the conveyor surfaces, the peanut plants are dropped and manipulated in such a manner as to deposit them in an inverted position on the ground as a single windrow, with the peanuts spaced from the ground and on top of the plant foliage. The windrows of peanut plants are subsequently picked up and processed through a thrashing operation.

Several types of apparatus appear in the prior art directed to harvesting two rows of peanut plants on a single conveyor and manipulating and depositing the plants inverted in a single windrow. Such apparatuses are in general referred to as peanut digger-shakers, and the following patents are representative of the pertinent patented art: U.S. Pat. No. 3,726,345 to Harrell et al, U.S. Pat. No. 3,734,194 to Whitfield, U.S. Pat. No. 3,804,176 to Harrell at al, U.S. Pat. No. 3,847,225 to Whitfield, U.S. Pat. No. 3,976,143 to Rodger and U.S. Pat. No. 3,989,111 to Hobbs.

The purpose of this invention is to provide an improved peanut harvesting apparatus that is both more efficient and economical to operate, which is of primary concern in the harvesting industry.

It is therefore the object of this invention to provide an apparatus for plowing four rows of peanut-laden plants, shaking the dug plants to remove soil therefrom and elevate the plants with the peanuts still attached thereto to the back of the apparatus, dropping the plants behind the apparatus as it moves forward over the ground, inverting the plants and depositing them on the ground where they have grown in two separate windrows with the peanuts above the ground. Another object of this invention is to provide an apparatus having two elevating bar-type conveyors side-by-side, each conveyor being disposed to receive two rows of plowed peanut plants, and having means for preventing foliage in the form of vines from the two adjacent center rows of plants from becoming entwined in the side-by-side mechanism and the foliage from the outside rows from becoming entangled in the side mechanism that are parts of the drive for the conveyors. A still further object is to provide an improved plow arrangement so that fouling of the side-by-side and the outside mechanism of the conveyors is substantially eliminated. A still further object is to place four rows of peanut plants in two windrows with the peanuts spaced from the ground. A further object is to provide a reshaker arrangement that removes additional soil from the peanut plants after they exit from the conveyor, and then pushes the plants over a set of plant inverting bars to deposit the plants in windrows on the ground.

These and other objects and advantages of the invention will be appreciated and become apparent from the following description with reference to the accompanying drawings, in which.

Generally speaking, the foregoing objects and others are accomplished in accordance with this invention by providing an apparatus for harvesting multiple rows of peanut plants having means for simultaneously plowing four rows of peanut-laden plants, two of the four rows being plowed by one set of two plows associated with one elevating and shaking conveyor and the other two rows being plowed by a second set of two plows associated with a second elevating and shaking conveyor. The plows in one set have their leading end oriented in one direction and the leading end of the plows in the other set oppositely oriented. The mounting of the sets of plows provides for a forward push of the leading end of the plows to opposite sides of the two center rows and away from the middle rows at the center of the frame of the apparatus. In this arrangement, each set of plows digs two rows of peanut plants separately and removes any growth from the space between the two center rows. The plowed plants from each set of plows are picked up by a separate elevating conveyor, by which they are conveyed to the rear of the apparatus as ribbons and shook during travel to loosen and remove soil before exiting from the conveyor.

The novel plow arrangement of this invention substantially avoids plugging between the two center plows. The elevating conveyors for each set of plows are positioned side-by-side with their inside drive mechanisms positioned adjacent to each other. Spaced projecting means normal to the surface of the conveyors are attached at adjacent sides of the conveyors to prevent foliage in the form of vines of the peanut plants from moving into or extending over the sides of the conveyors to prevent fouling of the side-by-side drive mechanism and the outside drive mechanisms of the conveyors.

In addition, the apparatus of this invention provides for the ribbons of peanut plants exiting from the rear of each conveyor to be dropped on a set of adjustable backward extending inverter rods attached to the apparatus at one end, and to be pushed rearwardly by a series of rotating reshaker spokes located on the surface of a revolving drum. The rotating reshaker spokes are continuously brought in contact with the ribbons of plants as they traverse down the inverter rods to reshake soil from the plants and cause the plants, as they progress rearward, to turn in such a manner that the peanut plants are inverted and set on the ground with the peanuts being spaced from the ground in a single windrow behind each conveyor. The adjustable inverter rods can be moved to form windrows that fit desired row patterns.

Figure 1:
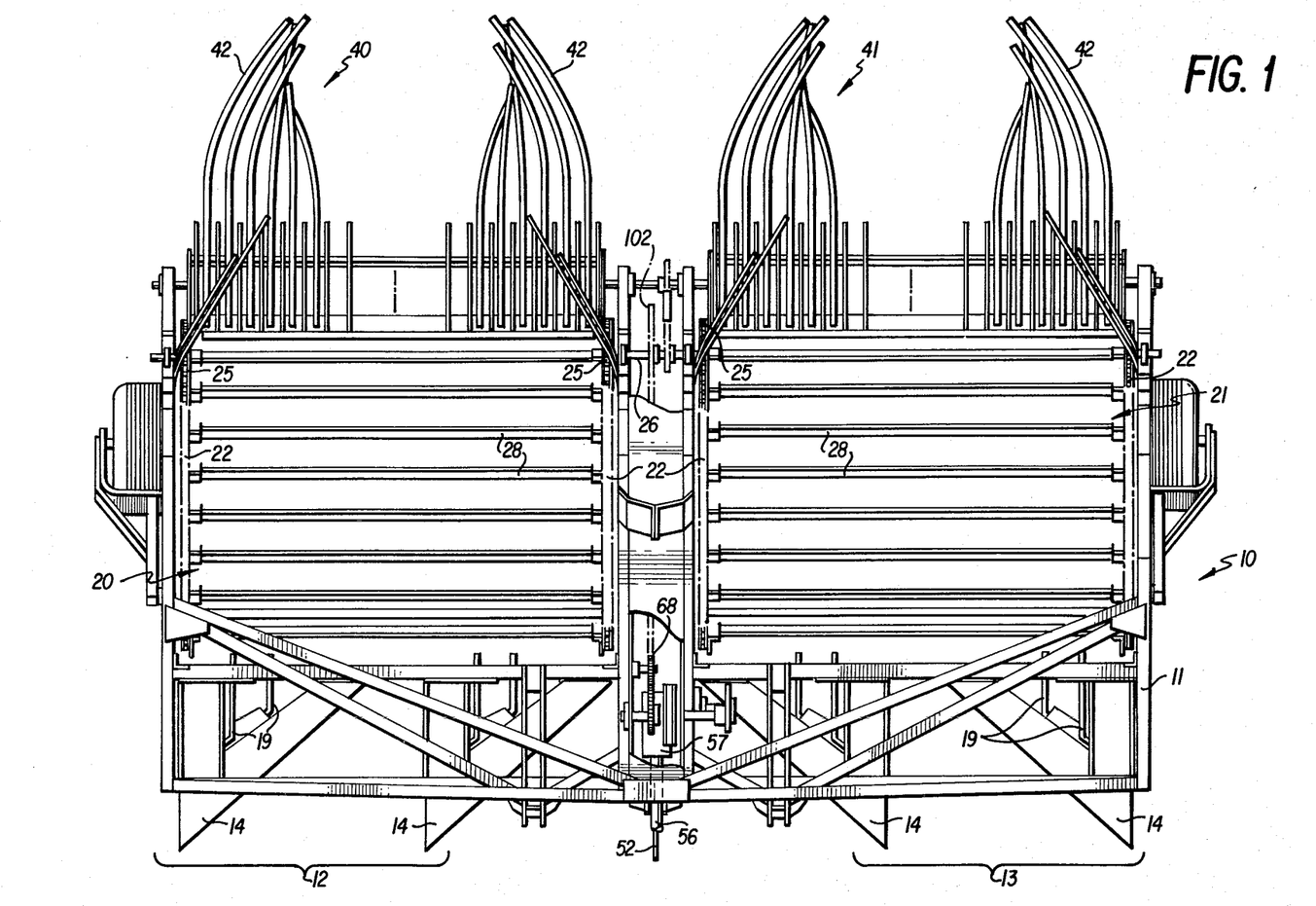
FIG. 1 is a top plan view of a peanut harvester of this invention.
Figures 2, 5:
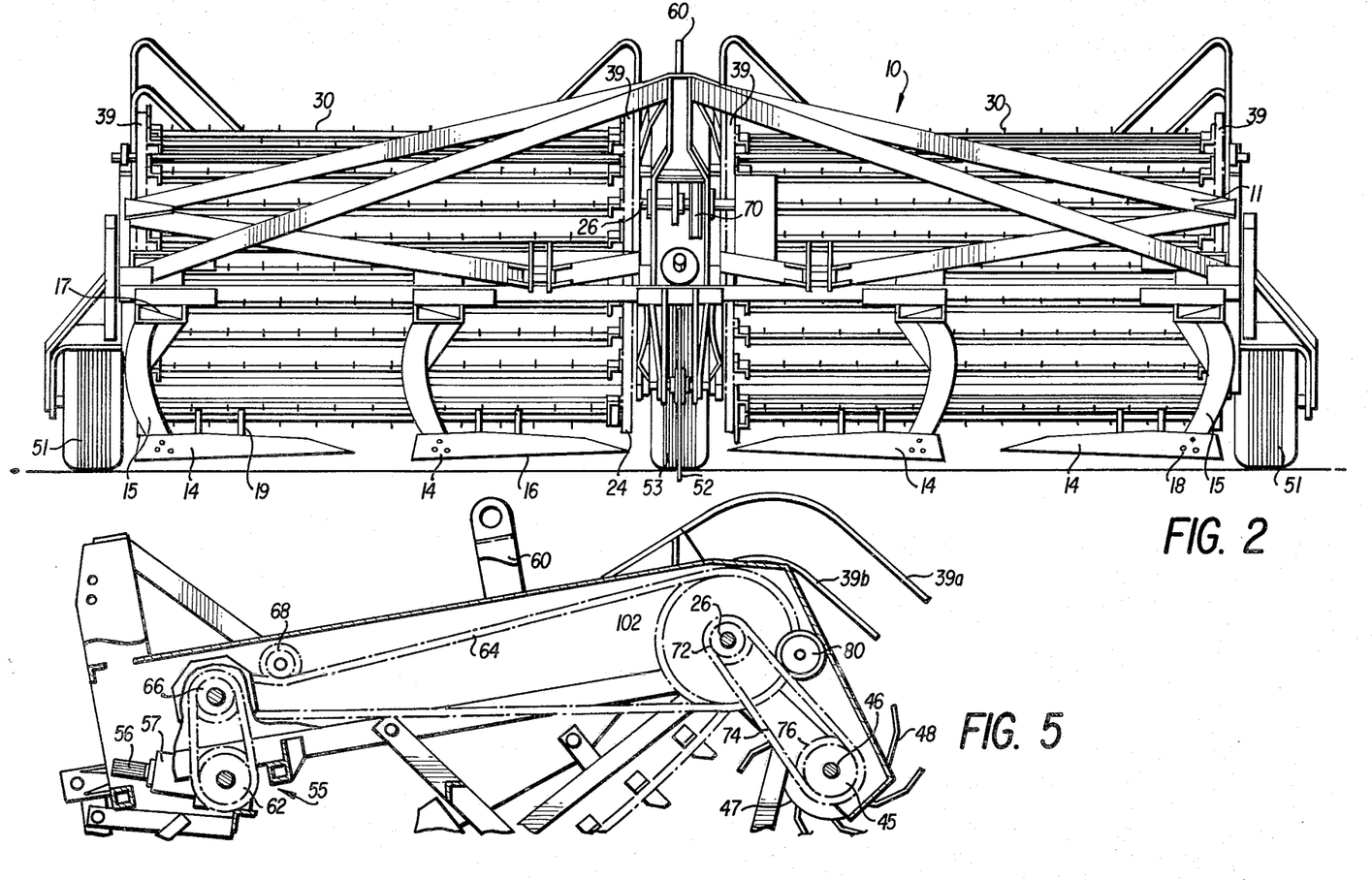
FIG. 2 is a front view in elevation thereof.
FIG. 5 is a partial view in elevation showing the drive arrangement for the inclined conveyors and a reshaker drum arrangement.

Referring now to the drawings, FIGS. 1 and 2 illustrate a peanut plant harvesting apparatus 10 having a frame 11. Supported on frame 11 and depending therefrom are two sets 12, 13 of plows 14, there being two plows in each set. The plows 14 are suspended from the frame 11 by tubular plow support members 15. The sets 12,13 of plows are positioned along the front of the frame 11, and when the apparatus 10 is harvesting rows of peanut plants, the line of plows 14 is normal to the rows of peanut plants. The sets 12,13 of plows are positioned with one set along one side of the front of frame 11 and the other set along the other side of the front of frame 11. Each plow 14 has a leading edge 16 disposed to enter the soil and plow a row of peanut plants adjacent the root network, which contains the buried peanuts, and lift the plants with their root network of attached peanuts from the soil. It will be appreciated that the root network carries considerable soil with the lifted plants.

The tubular plow support members 15 are fixed by welding at their elevated ends to hollow attaching members 17 fixedly mounted on frame 11. Each plow 14 is maintained in fixed position on the other end of the tubular plow support members 15 by a set of nuts and bolts 18 to place the plow at the required pitch and angle for the required depth of plowing and the proper angle for continuously lifting a row of peanut-laden plants from the soil.

The trailing edge of each plow 14 has two slide prongs 19 attached at one end to the plow with the free end extending rearward and upward. The plow arrangement of this invention provides for one set 12 of plows 14 to have a forward push of the leading end of the plows away from the center of the frame 11 and the other set 13 of plows 14 to have a forward push in the opposite direction, with each plow in position to continuously plow a row of peanut plants when the frame of the apparatus spans four rows of plants and is moving in a parallel direction to the rows of plants. In this position, the plows, when in engagement with the soil, lift the peanut plants and move soil away from the center space between the second and third rows of plants in front of the harvesting apparatus as it progresses downfield during the plowing operation.

Operatively positioned on frame 11 are a first and a second elevating conveyor means 20,21 positioned side-by-side. The first conveyor means 20 is positioned behind the first set 12 of plows and the second conveyor means positioned behind the second set 13 of plows. Each elevating conveyor means has laterally spaced sprocket drive chain means 22 on each side of the conveyor. The sprocket drive means 22 includes parallel spaced continuous link chains 23, each looped about a lower small sprocket wheel 24 and elevated driven larger sprocket wheel 25, the sprocket wheels 25 being mounted on a shaft 26 driven by sprocket chain 26a and sprocket wheel 26b as shown in FIG. 5.

Positioned between the parallel spaced linked chain 23 of each conveyor and normal thereto are a plurality of spaced conveyor plant carrying bars 28 having their opposite ends secured on opposite faces of a link 29 of the chain 23 so that rotation of the driven shaft 26 provides for a conveyor means having continuously rotating spaced carrying bars 28 that generate a substantially elliptical path and provide a continuous carrying surface that moves upwardly and rearwardly as the apparatus traverses the rows of peanut plants and, because of the movement of the chain and sprocket, shakes soil from the plants that is attached in the root network of peanuts (see FIG. 2).

Figures 3, 4, 6:
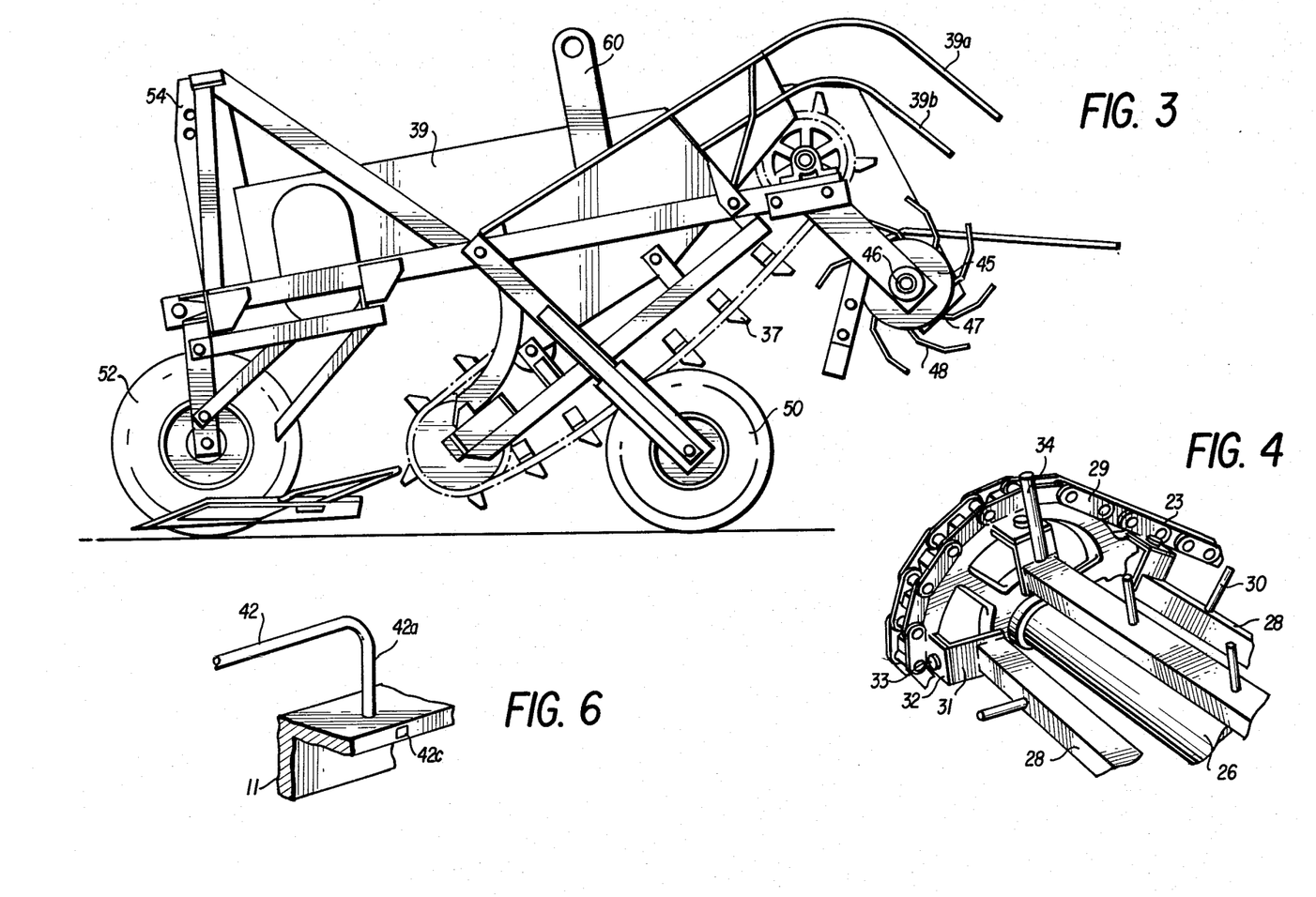
FIG. 3 is a partial side view in elevation showing coulter and frame support wheels, and one of the two inclined conveyors in position with respect to a plow.
FIG. 4 is a partial view in perspective of a portion of an inner chain link and sprocket drive arrangement of one of the conveyors with a projection means adjacent to the one end of a conveyor bar at its attachment to the chain link and sprocket drive arrangement.
FIG. 6 is a partial view in perspective of one of the adjustable inverter rods attached to the rear portion of the frame of the harvester.
Figure 7:
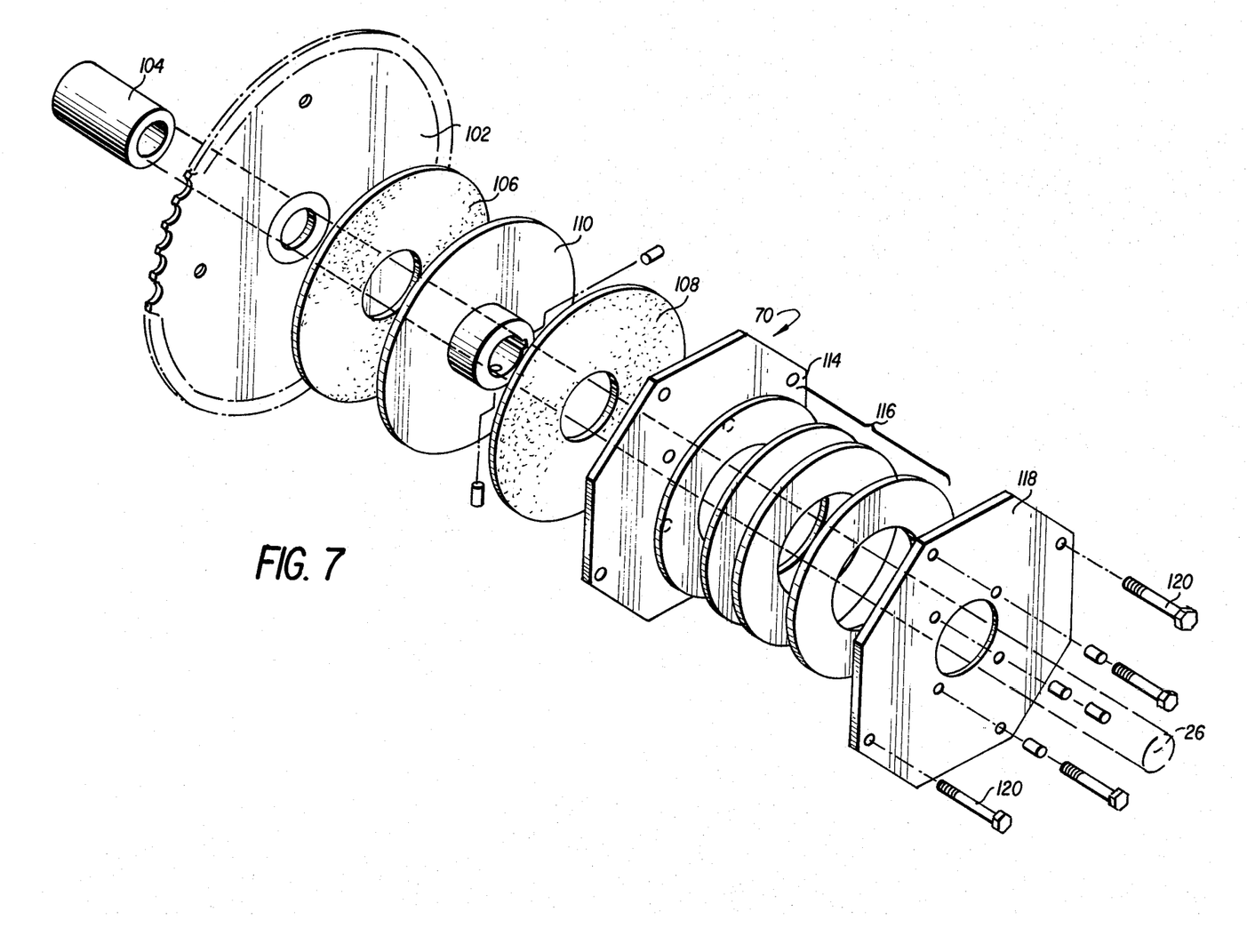
FIG. 7, is an exploded perspective view of one embodiment of a slip clutch assembly for transferring power from one conveyor drive to the other.

As illustrated in FIGS. 1, 2 and 4, each of the carrying bars 28 is provided with a set of spaced tines 30, all of which are approximately the same length. The tines 30 project outwardly from the outer face of each of the carrying bars and are arranged in a line with the end tines spaced inwardly from the side of the link chains 23 to which the carrying bars are operatively connected so that, when the conveyor is in operation during plowing, the tines act as catch fingers that project into the foliage and root network of the plants immediately after their uprooting by the plow and they have been guided onto the conveyor by the slide prongs 19. The carrying bar 28 conveys the plants received from the slide prongs 19 upwardly to an elevated position at the rear of the apparatus where the plants are dropped to be inverted and placed in windrows with the peanuts spaced from the ground.

Each conveyor bar 28 has an L-shaped bracket 31 fixed on each of its ends. The bracket 31 is, in turn, attached to a similar L-shaped link chain bracket 32 by bolt 33 as shown best in FIG. 4. In this construction, the outward face of each bar 28 is positioned below the spaced link chains which move the bar in a direction opposite to the movement of the apparatus 10.

The space between carrying bars 28 is provided by attaching the chain link brackets 32 to a series of links spaced equally from one another by links which do not have a bracket 32 attached to them. By using this symmetrical arrangement of spacing there is provided a series of conveyor bars 28 that are end connected to the inner link surfaces of the two parallel link chains 23 that form the drive means for producing the continuous motion of the conveyors.

The pattern of spaced tines 30 is such that on one bar the end tines are set in from the bar bracket 31 and on the next succeeding bar the end tines are spaced so that the end tines line up between the end tine and the next succeeding tine along the bar.

Positioned adjacent to bracket 31 and projecting from the surface of the carrying bar 28 on the link chains 23 of each conveyor means is a pin 34 which is longer than pins 30 and projects above the height of the pins 30 and the link chains 23. Pin 34 may be positioned on alternate carrying bars adjacent the L-shaped bracket 31 where the end pin or tine 30 is farther removed from the link chains than the end tine on the next succeeding carrying bar. These projection pins 34 assist in keeping the vines of the two inside ribbons of dug peanut plants, which are moving onto different conveyors, from becoming entangled in the side-by-side link chain and small sprocket wheels of the two parallel conveyor means, thus preventing fouling of the operation of the apparatus by pulling vines and other growth material from between the two conveyor means onto one of the conveyor means (see FIG. 4).

Advantageously, sprocket chains 23 are provided with longitudinally spaced thin cleats 37 (FIG. 3) which are a part of the link chain. The outward projection of the cleats 37 is higher than that of the tines 30 and is positioned at intervals spaced by an even number of chain links. The outer ends of the cleats 37 are of a size and shape such that they assist the moving of the divided plant foliage between the second and third rows so that they are parted and divided and pulled into engagement with the tines 34 and 30 of the conveyor bars 28, thus helping to prevent entanglement of the vines in the side-by-side link chains, the outside link chains, and small sprocket of the two parallel conveyor chains.

The open link chains which run on idler rollers are able to lift peanut vines which overhang the outside edge of the conveyor and, with the addition of their cleats 37 mounted on the chains, heavy grass and other foreign plant material can be lifted, or matted sod can be sliced, chopped or cut to prevent fouling of the sprocket drive chain means.

Positioned on the outside of each side of the first and second conveyor chains and between them are side shields 39 that prevent plant vines and foliage from flopping over the sides of the conveyor means.

Positioned on the apparatus 10 and projecting rearwardly therefrom are a first and second set 40,41 of inverter rods 42 onto which ribbons of peanut plants drop as they exit from the elevated end of the first and second conveyor. Each set of inverter rods has a right and left series of spaced rods 42 attached at one end to the rear portion of the apparatus and having free ends that extend rearwardly and downwardly, each spaced rod following a different contour. The right and left series of rods 42 retard the fall of the peanut-laden ribbon of plants to allow the foliage upper portion to drop more quickly thus effecting rotation of the ribbon of conveyed peanut plants to place it on the ground in a turned position with the network of peanuts raised above the ground. Each of the spaced inverter rods 42 in a set of rods has a particular shape so that the ribbons of peanut plants are guided and turned as they move to the end of the rods. In each set 40, 41 there are six left-hand and six right-hand rods 42. The six rods in each set are spaced inwardly from each side of a conveyor. Attached to the side shields 39 are two spaced rods 39a and 39b(FIG. 3) that are curved inwardly and downwardly to guide the ribbon of plants onto six spaced rods 42 as shown in FIG. 1. The first four spaced rods 42 curve inwardly from the side of the conveyor and progressively downward and the remaining two rods 42 curve downward (see FIGS. 1 and 3).

Each of the inverter rods 42 is attached to the frame in such a manner as to be adjustable both in a vertical direction and in a turning direction. This is accomplished by the rods 42 having a vertical shaft end 42a which fits into an opening 42b of a portion of the frame and is held in the proper vertical height position and in a set turned position by a set of screws 42c (FIG. 6). Thus, by adjusting the six inverter rods 42 of each series 40 and 41 of rods in each set for proper height and angle, the desired windrows are produced between a series of left- and right-hand inverter rods 42 (see FIG. 6).

It will be appreciated that the movement of the ribbon of plants on the surface of the conveyor means will remove loose dirt, but it has been found that more dirt is removed as the plants are moved over splines 48 by drum 45 formed by circumferentially spaced bars operatively mounted across the back end of frame 11 and under the two sets 40,41 of inverter rods 42. The drum 45 is mounted on a shaft 46 that is operatively connected and driven in unison with the drive shaft 26 that powers the first and second conveyor means 20,21. The drum 45 has a surface 47 which contains a series of groups of spaced curved splines 48, each group of splines 48 equally spaced one from the other and the splines 48 emanating from the surface 47 of the drum with the splines pitched in an opposite direction to the rotational direction of drum 45. The end portions of each group of splines 48 are of such height that as the drum 45 rotates end portions of the splines in each group pass between adjacent spaced rods 42 near their end attachment to the frame 11, or in the case of some of the group of splines in the series, adjacent to rods 42. Drum 45 extends longitudinally across the back of the digger-shaker in a plane substantially normal to the vertical axis of the apparatus, or, in other words, substantially parallel to the ground.

Thus, a constant lifting and pushing of the peanut plants is effected as the plants are continuously dropped over the end of the conveyor, which also aids in removing dirt from the plants as the plants are pushed from the fixed end portion of the inverter rods 42 down the rods 42 to assist in the inverting of the plants to produce a single windrow behind each of the two conveyors 20, 21.

The frame 11 is supported and moved on wheel assembly 50 which includes a pair of spaced side wheels 51 that span four rows of peanut plants, the wheels riding in the space between the rows. A freely turning coulter wheel 52 is centrally mounted and located in the front of the frame 11 of the apparatus 10 and is positioned between the first and second sets 12, 13 of plows. The coulter wheel 52 has a sharp circular edge that cuts the vines between the second and third rows as the apparatus travels over the four rows of plants so that each set of plows will feed two ribbons of dug plants to each of the first and second conveyors 20, 21 (see FIG. 5).

Advantageously, the rear portion of the frame 11 may have a rear support wheel 53 located in the center between the first and second conveyor means 20, 21 and riding in the space between the second and third rows of plants (see FIGS. 1 and 2).

Attached to the frame 11 is a tractor-trailer hitch 54 for making connection with a tractor that moves the harvesting apparatus and controls the plowing or non-plowing position of the frame, and a lifting bracket 60.

The first and second conveyors 20,21 and the drum 45 are rotated by common power source having a power take-off drive means 55 (FIGS. 4 and 5) which transmits rotary power received from a tractor connected to hitch 54 of frame 11. The rotary power is supplied from a power drive output (PDO) of the tractor through a take-off shaft 56 which is operatively connected to a gear box 57 attached to the frame of the apparatus.

An output shaft 62 of gear box 57 is coupled to an endless drive chain 64 via a drive sprocket 66. Drive chain 64 is further coupled to an adjustable idler wheel 68 provided for varying the tension on drive chain 62, and to a chain sprocket 102 which forms part of a slip clutch assembly 70 (see FIG. 6). The sprocket 102 rotates about a shaft sleeve 104 encircling conveyor drive shaft 26 and is coupled via friction discs 106 and 108 to a drive disc 110. Drive disc 110 is provided with a keyway which mates with driving shaft 26. Shaft 26 is operatively connected to the drive shaft 46 of the shaker drum 45 by sprocket 72 fixed to shaft 26 which, in turn, is coupled to a drive chain 74 and a sprocket 76 fixed to drive shaft 46. Drive chain 74 is further coupled to an adjustable idler wheel 80 provided for varying the tension on drive chain 74.

The clutch assembly 70 also includes a spring and clutch disc 114, a series of springs 116 and a spring mounting disc 118. Spring mounting disc 118, springs 116, spring clutch disc 114, and sprocket 102 are held together in a working clutch assembly via screws or bolts 120. Under normal operating conditions the motive power is supplied by chain 64 to sprocket 102 which is coupled via slip clutch 70 to drive shafts 26 in an unimpeded manner. If, during the operation of the harvesting apparatus either of the conveyors are prevented from turning, the sprocket 102 will slip via the clutch 70 thus preventing damage to the mechanical elements of the harvester or the power drive output of the tractor. The slip clutch assembly also allows the outer sections to be raised or lowered on tractors equipped with a P.T.O. brake even if the brake is engaged.

The drive chain 64 and associated idler 68 and sprocket wheel 102 are partially protected from dirt, mud, vines, etc. by a suitable covering or housing 161.

Appropriate gear ratios are chosen to provide conveyor speeds which allows the uprooted vines to be lifted, transported as a continuous ribbon on each conveyor surface and discharged from the conveyor without pitching of any vines or unnecessary break up of the windrows. This helps to ensure that the peanuts will not prematurely detach from the vines.

In operation, a tractor is coupled to the tractor-trailer hitch 54 is positioned centrally in the front of the apparatus. The P.T.O. of the tractor is attached via a shaft (not shown) to gearbox input shaft 56. Lowering of the apparatus for plow engagement with the soil is accomplished by hydraulically controlled lifting mechanism (not shown). After lowering of the apparatus so that the plows are aligned in a position to plow under four adjacent rows of peanut-laden plants, the plowing operation is begun by engaging the P.T.O. output to cause the conveyor chains to begin rotating as the plows are moving under the rows of plants. As the apparatus is transported over the row of plants being plowed, the leading edge of each conveyor section, i.e., that closest to the ground, picks up the vines via the pins and transports them in generally continuous ribbons along the upper surface of the conveyor to the discharge end of the conveyor where the continuous ribbons of plants are gently discharged and deposited on the ground in windrows. When the harvesting of four rows of plants is completed, the tractor operator may again raise the conveyor by supplying hydraulic pressure to the lifting mechanism apparatus for transporting the harvester to a new location or for storage.

Although the present invention has been described with reference to a particular embodiment thereof, it should be appreciated that various modifications can be made to this specific embodiment without departing from the spirit and scope of the present invention. For example, although the invention has been particularly described with reference to harvesting peanut plants, other types of plants may also be harvested with the invention. Accordingly, the foregoing description is to be taken as purely exemplary and not limiting of the present invention which is defined solely by the appended claims.

What is claimed is:

1. An apparatus for plowing four rows of root plants disposed in substantially parallel spaced rows and deposit them in a turned position on the ground as two windrows comprising: a frame having wheel means for moving said frame over said rows of plants; two sets of plow shares attached to said frame having two plow shares in each set, said plow shares in one set having their leading ends oriented in one direction with the leading ends of the other set oppositely oriented, each plow share adapted to remove a ribbon of plants; a rotary coulter wheel positioned between said two sets of plow shares for cutting overlapping vines between the second and third rows of plants; two parallel conveyors positioned on said frame, each conveyor having a surface for receiving and elevating said ribbons of plants uprooted by a set of plow shares, one conveyor positioned behind one set of plow shares and the other conveyor positioned behind the other set of plow shares, each of said conveyors having separate sprocket drive chain means for rotating said conveyor surfaces in unison and shaking soil from the plants on said conveyor, each of said drive means powered from a common power source; spaced projection means operatively positioned in the area of the sides of the surface of each of said conveyors and projecting outwardly above said sprocket drive chain means, each of said spaced projection means adapted to pull uprooted foliage and vines onto said conveyors at the side of the conveyors, and means for cutting any foliage and vines that extend over the sides of the conveyors to protect the functioning of said sprocket drive chain means; and means positioned on said frame for turning the ribbons of plants dropped from the upper end of each conveyor, with the ribbons of plants deposited in a single windrow.

2. The apparatus of claim 1 in which said spaced projection means are a plurality of spaced pins that project from the conveyor surface to above the height of the sprocket drive chain means and are positioned adjacent to the side of the sprocket drive chain means.

3. The apparatus of claim 1 in which the said means for cutting foliage and vines comprises cleats carried by said sprocket chain that project upwardly from the chain of said drive sprocket chain means.

4. The apparatus of claim 1 in which a sprocket drive chain means is positioned on each side of each conveyor and is operatively connected to a driven shaft, parallel spaced carrying bars secured to the sprocket chains and spanning the space therebetween, said bars being positioned normal to said sprocket drive chain means, said spaced projection means being positioned at the end of said carrying bars at their attachment to said chain link.

5. The apparatus of claim 1 in which said means for turning and depositing the ribbons of plants has a drum associated therefor pushing the plants over inverter rods and for removing additional soil clinging to the plants.

6. The apparatus of claim 1 in which said means for turning and depositing the ribbons of plants dropped from the upper end of each conveyor in a single windrow is a set of plant inverter rods positioned behind each conveyor, each set having a right- and left-hand series of said rods of different configuration and a projecting free end, the rods in each series directed downwardly and progressively rearward and inward towards each other; a drum means mounted on said frame and extending across the rear thereof and parallel to the ends of said conveyors having a drum drive means operatively connected to said common power source, said drum means rotatable in the direction of rotation of said conveyors, said drum means having a series of spaced splines radiating outwardly from its surface and curved in a direction opposite to the surface rotation of said drum means with the end of the splines in each series at the top of the turn of the drum means projecting above the surface of adjacent inverter rods to engage continually spline by spline the ribbons of plants as they drop from the upper end of each conveyor to push the plants and to shake oil from the root network while pushing the ribbons of plants rearward as they are formed and deposited on the ground in a windrow behind each conveyor.

7. The apparatus of claim 6 in which the inverter rods attached to the frame have means for vertical adjustment and angular positioning to produce a profile between left- and right-hand sets of rods that produces a windrow of desired shape behind each conveyor.

8. The apparatus of claim 6 in which each side of each conveyor has a left- and right-hand side shield positioned outside the sprocket drive chain means, each side shield having attached thereto two inverter rods which extend outwardly and downwardly and are angled towards each other, and the remaining inverter rods are operatively attached to the frame and with the projecting spokes as they are rotated passing along the adjacent sides of each inverter rod attached to the frame.

9. The apparatus of claim 1 in which said common power source is a power take-off drive means positioned between the two parallel conveyors and having means adapted to be connected to a tractor for providing said power source, said powwer take-off means adapted to rotate the drive shaft of said sprocket drive chain means and the drive shaft of said reshaker drum means so as to turn the parallel conveyor surfaces and the reshaker drum surface in unison.

10. An apparatus for harvesting peanut-laden plants disposed in substantially parallel spaced rows, said apparatus being adpated to be pulled and powered by a tractor having a power source and comprising means for removing said plants from their growing sites comprising two pairs of laterally spaced plow shares arranged for plowing substantially simultaneously four of said rows as the apparatus is moved longitudinally thereover, each plow share having a leading and trailing end, means for supporting said plow shares below said apparatus when each plow share traverses one of said rows and with the trailing end of each plow included rearwardly and laterally inward of the leading end, means for receiving said plants after they are dug and disposed adjacent said trailing end of the plow share comprising a pair of conveyors operably associated with the apparatus and disposed in laterally spaced side-by-side relationship with a first conveyor disposed to receive and convey the plants dug by the plow shares of one of said sets to an elevated position where they fall in a windrow to the rear of said apparatus as it moves over said rows, and a second conveyor disposed to receive and convey plants dug by the plow shares of the other of said sets to an elevated position where they fall in a windrow to the rear of the apparatus as it moves over said rows, each of said conveyors comprising laterally spaced sprocket chains, each looped about a rotatable sprocket wheel at the leading side of the apparatus and an elevated sprocket wheel adjacent the trailing side of the apparatus, means for driving each assembly of sprocket wheels and chains associated with the apparatus, spaced conveyor bars operatively connected at their ends to said sprocket chains for rotation therewith about said sprocket wheels and spanning the space between the sprocket chains, a row of spaced tines positioned on said bar means for supporting plants on said bars as they are elevated by the said sprocket chains, longitudinally spaced cleats operatively connected to said link chains adapted to slice clumps of plants disposed to hang outside the conveyor chain, at least one idler wheel disposed between said pair of sprocket wheels for diverting the chain from its normal path of travel, a power source for rotation of said conveyor with the upper reach of the conveyor moving towards its elevated position, and means for rotating the second conveyor driven by rotation of the first conveyor, and means for guiding said plants as they fall from the escalated position on the conveyors comprising a plurality of inverter rods disposed on each side of each conveyor at the elevated position of the apparatus adjacent to the escalated termination points of said conveyors and twisted inwardly to guide the plants on each conveyor together and a drum disposed across the trailing end of the apparatus to intercept plants falling from said rods and to drop the plants to the ground with their network of peanuts spaced above the ground, and means for rotating the drum.

11. The apparatus of claim 1 wherein said sprocket chains are driven by the power take-off of a tractor through a slip clutch.

12. An apparatus for digging, shaking and windrowing peanut-laden vines growing in spaced parallel rows comprising a frame supported on laterally spaced wheels, said frame having a width substantially equal to the distance between the external of four rows of growing peanut plants, said wheels comprising a wheel at each side of the apparatus and one in the middle, all located to roll over the ground between rows of growing peanut plants, two pairs of side by side plow shares supported at the front of the apparatus and suspended on the frame by tubular support members where one plow share of each pair will plow one row of peanut plants as the apparatus is moved over the ground, each of said plow shares being disposed with its forward end nearest a side of the apparatus and its trailing end nearest the middle of the apparatus and with its longitudinal axis substantially parallel to that of the other plow share of the pair, conveyor shakers disposed side by side with one shaker behind each pair of plow shares, each of said conveyor shakers having a pair of laterally spaced sprocket chains looped about a first sprocket wheel at the front of the apparatus and a second sprocket wheel at an elevated position near the trailing end of the apparatus, a series of bars spanning the space between each of said pairs of sprocket chains having their ends operatively secured to said chains for rotation therewith as the chains rotate about the sprocket wheels, a series of spaced bent splines, disposed to intercept plants falling from the said bars from their elevated position at the trailing end of the loop of the said chains and guide movement of the plants towards the ground while supporting the plants adjacent their roots with the foliage disposed below the rods in the spaces therebetween, and a rotating drum disposed across the apparatus having splines which move the plants over the said bent splines whereby said plants fall behind the apparatus foliage first; and means for rotating a first of said side by side conveyor shakers with its upper reach moving towards its elevated position and means for rotating the second of said side by side conveyor shakers driven by rotation of said first conveyor shaker.

13. An apparatus for digging peanut-laden plants disposed in substantially parallel spaced rows and removing soil clinging thereto, said apparatus being adapted to be pulled and powered by a tractor having a power source and comprising means for removing said plants from their growing sites comprising two pairs of laterally spaced plow shares arranged for plowing substantially simultaneously four of said rows as the apparatus is moved longitudinally thereover, each plow share having a leading and trailing end, means for supporting said plow shares below said apparatus when each plow share traverses one of said rows and with the trailing end of each plow share disposed rearwardly and laterally inwardly of the leading end and with their longitudinal axis substantially parallel to each other but disposed oppositely from the longitudinal axis of the adjacent pair, means for receiving said plants after they are dug disposed adjacent to said trailing end of each plow share comprising a pair of conveyors operably associated with the apparatus and disposed in laterally spaced sidy-by-side relationship with a first conveyor disposed to receive and convey the plants dug by the plow shares of one of said pairs to an elevated position where they fall in a windrow to the rear of said apparatus as it moves over said rows, and a second conveyor disposed to receive and convey plants dug by plow shares of the other of said pairs to an elevated position where they fall in a windrow to the rear of the apparatus as it moves over said rows, each of said conveyors comprising laterally spaced sprocket chains, each looped about a rotatable sprocket wheel at the leading side of the apparatus and an elevated sprocket wheel adjacent the trailing side of the apparatus, spaced conveyor bars operatively connected at their ends to said sprocket chains for rotation therewith about said sprocket wheels and spanning the space between the sprocket chains, a row of spaced tines positioned on said bar means for supporting plants on said bars as they are elevated by the said sprocket chains, longitudinally spaced cleats operatively connected to said link chains adapted to splice clumps of plants disposed to hang outside the conveyor chain, at least one idler wheel disposed between said pair of sprocket wheels for diverting the chain from its normal path of travel, means for connecting a first of said sprocket wheels to a power source for rotation of said conveyor with the upper reach of the conveyor moving towards its elevated position, means for rotating the second conveyor driven by rotation of the first conveyor, and means for guiding said plants as they fall from the elevated positions of the conveyors.

14. An apparatus for digging and shaking pairs of substantially parallel rows of growing peanut laden plants which comprises pairs of plow shares laterally spaced to correspond with said parallel rows, each of said plow shares having a leading end supported on the apparatus and a trailing end, the supported end of one of each pair of plow shares being adjacent laterally to the other of that pair and the trailing edges of each pair of plow shares facing the trailing edges of the other pair of plow shares, means for receiving, shaking and elevating plants in rows as said rows of plants are dug comprising a pair of laterally spaced first and second conveyors, means comprising a sprocket chain and sprocket wheel assembly for driving each of the first and second conveyors, means for operably connecting the first of said driving means to a power take-off of a tractor, means for operably connecting said first driving means to the second driving means comprising a slip clutch for transferring power from the first to the second conveyor, and means for dropping said dug peanut laden plants in windrows from their elevated positions to the ground behind the apparatus.

15. A method of plowing four rows of peanut plants or the like comprising:

plowing substantially parallel rows of plants with two sets of two plows;

applying a forward push on the leading end of the plows of one set to the one side of the two central rows and applying forward push on the leading end of the plows of the other set to the opposite side of the two central rows; continuously removing the plants from their growth sites in each row as a ribbon of plants, cutting the overlapped foliage and vines between the two central rows of plants;

conveying and elevating the ribbon of plants removed by a first of said sets of plows on a conveyor positioned behind that set of plows, conveying and elevating the ribbon of plants removed by the second of said sets of plows on a second conveyor positioned behind the said second set of plow shares;

cutting foliage and vines which extend over the sides of the conveyors to prevent fouling of movement of the conveyor;

shaking soil from the plants during conveying; dropping said ribbons of plants downwardly from the upper end of each conveyor; and turning the ribbons of peanut plants from each conveyor to form a windrow with peanuts spaced above the ground.

* * * * *

UNITED STATES PATENT AND TRADEMARK OFFICE
CERTIFICATE OF CORRECTION

PATENT NO. : 4,257,486
DATED : March 24, 1981
INVENTOR(S) : Oliver K. Hobbs

It is certified that error appears in the above-identified patent and that said Letters Patent are hereby corrected as shown below:

Column 11, line 5, delete "a first" and substitute therefor --- simultaneously both ---;

Column 11, line 30, change "sidy" to --- side ---;

Column 11, line 54, delete "a first of";

Column 11, line 55, change "conveyor" to --- conveyors ---;

Column 12, line 1, delete "its" and substitute therefor --- their ---;

Column 12, lines 2 and 3, change "position" to --- positions---, and delete "means for rotating the second conveyor driven by rotation of the first conveyor".

Signed and Sealed this

Thirtieth Day of June 1981

[SEAL]

Attest:

RENE D. TEGTMEYER

*Attesting Officer*   *Acting Commissioner of Patents and Trademarks*